(12) United States Patent
Kisaka et al.

(10) Patent No.: US 7,724,464 B2
(45) Date of Patent: May 25, 2010

(54) RECORDING DISK AND DISK DRIVE

(75) Inventors: Masashi Kisaka, Kanagawa (JP);
Fuminori Sai, Kanagawa (JP); Naoyuki Minami, Kanagawa (JP); Sadamichi Sone, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/008,426

(22) Filed: Jan. 10, 2008

(65) Prior Publication Data

US 2009/0086362 A1   Apr. 2, 2009

(30) Foreign Application Priority Data

Jan. 10, 2007   (JP) .............................. 2007-002295

(51) Int. Cl.
*G11B 5/58* (2006.01)
(52) U.S. Cl. ....................... 360/77.01; 360/49
(58) Field of Classification Search ........................ None
See application file for complete search history.

(56) References Cited

U.S. PATENT DOCUMENTS

| | | | | |
|---|---|---|---|---|
| 4,862,295 A * | 8/1989 | Tanaka et al. ................. 360/48 |
| 5,442,499 A * | 8/1995 | Emori ...................... 360/77.08 |
| 5,631,783 A * | 5/1997 | Park .............................. 360/51 |
| 5,784,216 A * | 7/1998 | Zaharris ....................... 360/48 |
| 5,784,219 A * | 7/1998 | Genheimer .............. 360/77.08 |
| 5,963,387 A * | 10/1999 | Son .............................. 360/49 |
| 6,469,853 B1 | 10/2002 | Satoh |
| 6,865,042 B2 * | 3/2005 | Dunn et al. .................... 360/48 |
| 7,110,208 B1 * | 9/2006 | Miyamura et al. ....... 360/77.08 |

* cited by examiner

*Primary Examiner*—K. Wong
(74) *Attorney, Agent, or Firm*—Townsend and Townsend and Crew LLP; Patrick Duncan

(57) ABSTRACT

Embodiments of the present invention provide a recording disk capable of curtailing the amount of servo data to be stored thereon, and a disk drive. According to one embodiment, servo data area sets each of a first servo data area and plural second servo data areas arranged in that order in a read direction HR are arranged successively on each of tracks of a magnetic disk. Stored in a second sector data section included in the second servo data area is data representing a distance in the read direction HR from the position of the first servo data area to that of the same second servo data area. The amount of data stored in the second sector data section is less than that of data stored in a first sector data section included in the first servo data area.

14 Claims, 7 Drawing Sheets

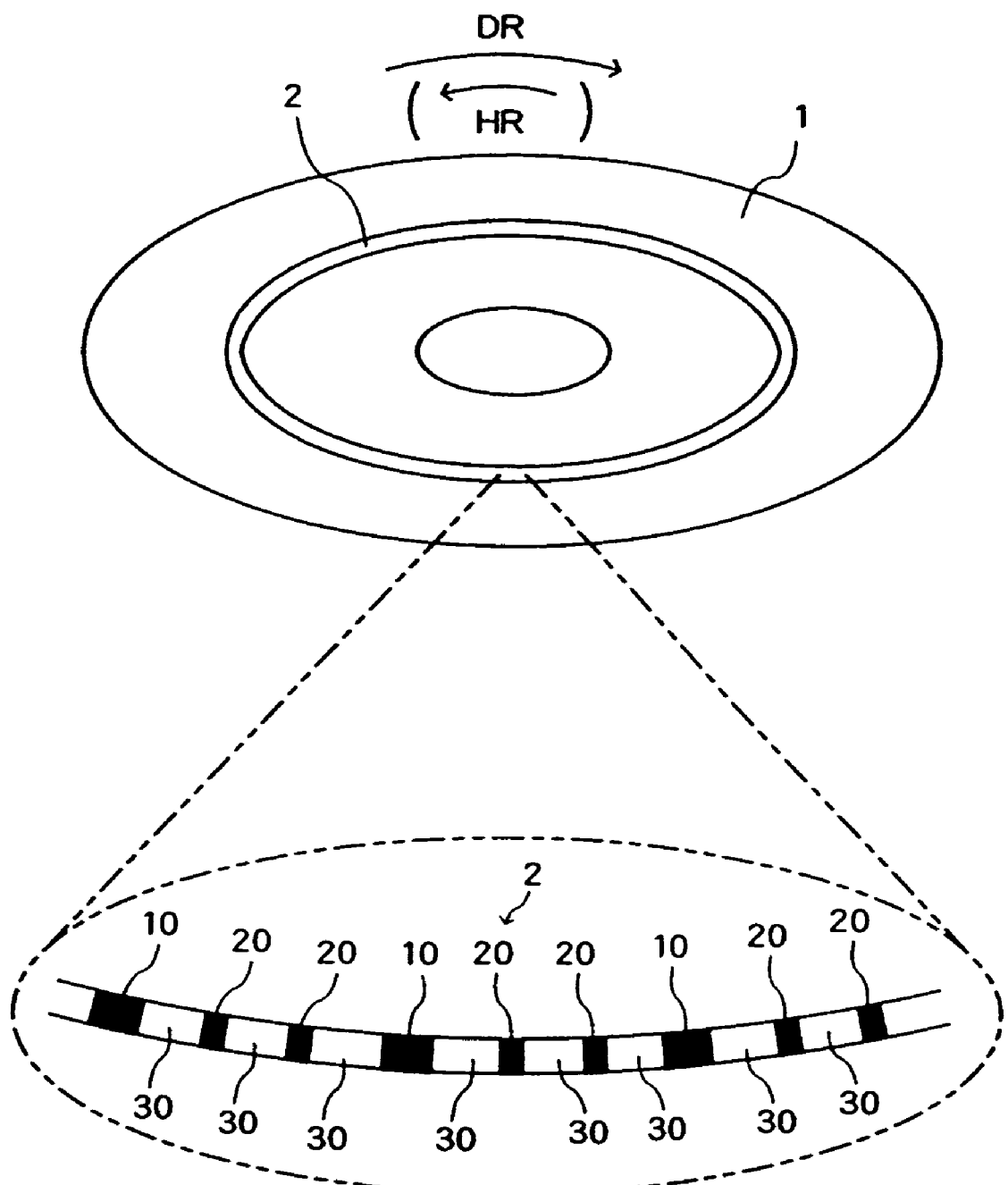

RECORDING DISK AND DISK DRIVE

CROSS-REFERENCE TO RELATED APPLICATION

The instant nonprovisional patent application claims priority to Japanese Patent Application No. 2007-002295 filed Jan. 10, 2007 and which is incorporated by reference in its entirety herein for all purposes.

BACKGROUND OF THE INVENTION

In a disk drive, such as a hard disk drive, a recording disk has circular tracks formed in its major surface and storing user data and servo data. The servo data is used for controlling the movement of a head for writing or reading operations. The servo data includes track data on the tracks, and sector data identifying sectors in the tracks.

The storage capacity of recording disks has been progressively increased in recent years. The ratio of the servo data to all the data recorded on the recording disk has increased as the storage capacity increases. There is a possibility that such increase of the servo data reduces the capacity for storing user data.

For example, when the width of tracks is reduced to provide a recording disk of a large storage capacity, head positioning accuracy needs to be increased. Therefore, the number of servo data areas in the tracks is increased and sampling frequency at which servo data is sampled is increased. Consequently, bit length for sector data increases and servo data increases.

When the number of tracks is increased to increase the storage capacity of the recording disk, bit length necessary for track data and servo data increase.

BRIEF SUMMARY OF THE INVENTION

Embodiments of the present invention provide a recording disk capable of curtailing the amount of servo data to be stored thereon, and a disk drive. According to the particular embodiment of FIG. 1, servo data area sets each of a first servo data area 10 and plural second servo data areas 20 arranged in that order in a read direction HR are arranged successively on each of tracks 2 of a magnetic disk 1. Stored in a second sector data section included in the second servo data area 20 is data representing a distance in the read direction HR from the position of the first servo data area 10 to that of the same second servo data area 20. The amount of data stored in the second sector data section is less than that of data stored in a first sector data section included in the first servo data area 10.

BRIEF DESCRIPTION OF THE DRAWINGS

FIG. 1 is a pictorial view of assistance in explaining the structure of a magnetic disk.

DETAILED DESCRIPTION OF THE INVENTION

Figure 2A:
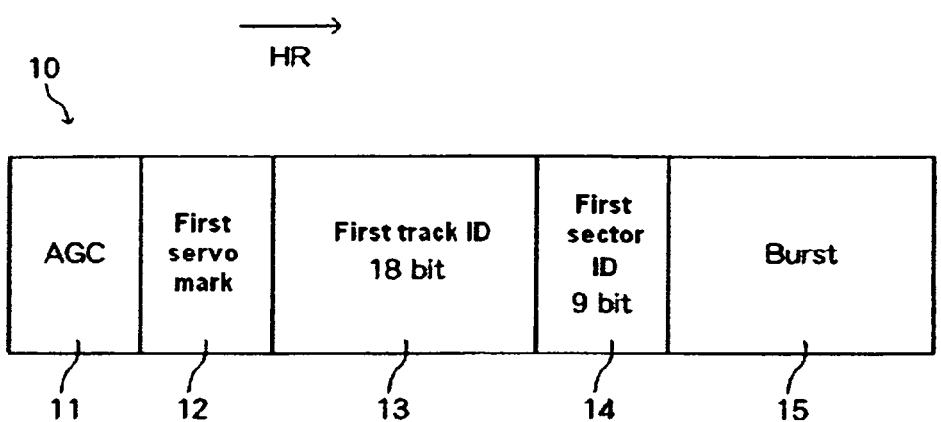
FIGS. 2(A) and 2(B) are diagrammatic views showing first servo data areas and second servo data areas in the magnetic disk by way of example.

Embodiments of the present invention relate to a recording disk storing servo data and a disk drive using the recording disk.

Embodiments of the present invention have been made under the foregoing circumstances and it is an object of the present invention to provide a recording disk capable of curtailing the amount of servo data to be recorded thereon, and a disk drive.

Embodiments of the present invention provide a recording disk having first and second servo areas arranged along tracks; wherein each of the first servo data areas includes a first sector data part indicating the position of the first servo data area in the track, and each of the second servo data areas includes a second sector data part indicating the position of the second servo data area with respect to the position of the first servo data area and storing a less amount of data than the first sector data part.

In the recording disk according to embodiments of the present invention, the first servo data area includes a first track data part identifying the track among all the tracks, and the second servo data area includes a second track data part identifying the track among the adjacent tracks and storing a less amount of data than the first track data part.

A disk drive according to embodiments of the present invention includes: the recording disk of the present invention; a head for reading servo data from the recording disk; an actuator for moving the head relative to the recording disk; and a position control circuit for indicating the present position of the head on the basis of servo data read by the read head, and driving the actuator on the basis of a positional error between a desired position of the read head and the present position of the read head; wherein the position control circuit indicates a position of the head on the track on the basis of the servo data read from the first servo data area, and then indicates the position of the head on the track by indicating the position of the head with respect to the indicated position on the basis of the servo data read from the second servo data area.

In the disk drive according to embodiments of the present invention, the position control circuit includes a sector counter for counting the number of cycles of an operation performed for reading servo data from the second servo data area after the servo data has been read from the first servo data area.

In the disk drive according to embodiments of the present invention, data representing order of the second servo data areas arranged in a direction in which the data reading operation of the head proceeds with respect to the first servo data area is recorded in the second sector data part included in the second servo data area, and the position control circuit compares the order of the second servo data read from the second servo data area and the number of cycles of an operation for reading data from the second servo data areas counted by the counter to see whether or not the order of the second servo data and the number of cycles of the operation coincide with each other.

The disk drive according to embodiments of the present invention includes the recording disk, the position control circuit indicates the present position of the head by acquiring only the servo data from the first servo data area when a position to which the head is to be moved with respect to the present position of the read head is outside an adjacent track range covering the adjacent tracks, and the position control circuit indicates the present position of the head by acquiring the servo data from the first and the second servo data area when a position to which the read head is to be moved is within the adjacent track range.

Embodiments of the present invention curtail the amount of servo data to be recorded on the recording disk.

Certain embodiments of the present invention will be described with reference to the accompanying drawings.

A disk drive in a preferred embodiment according to the present invention is a magnetic disk drive, such as a hard disk drive. The embodiments of present invention are applicable to other disk drives employing a recording disk storing servo data.

FIG. 1 is a view of assistance in explaining the structure of a track on a magnetic disk 1. The magnetic disk 1 is a disk having a major surface on which data is recorded magnetically. The magnetic disk 1 is incorporated into a magnetic disk drive, which will be described later. A magnetic head moves above the major surface of the magnetic disk 1 to write data to or read data from the magnetic disk 1. The magnetic disk 1 is rotated during writing data to and reading data from the magnetic disk 1. A direction in which the magnetic head is moved to read data from the magnetic disk, namely, a read direction HR, is opposite a rotating direction DR in which the magnetic disk 1 rotates.

Plural tracks 2 are formed concentrically about the center of the magnetic disk 1 on the major surface of the magnetic disk 1. Only one of the tracks 2 is shown in FIG. 1.

The track 2 has user data areas 30 for storing user data, and servo data areas for storing servo data. The user data areas 30 and the servo data areas are arranged alternately along the track 2. The servo data areas include two types of servo data areas, namely, first servo data areas 10 and second servo data areas 20.

The plural second servo data areas 20 are disposed between the two adjacent first servo data areas 10 on the track 2. That is, servo data area sets each of the one first servo data area 10 and the plural second servo data areas 20 arranged in that order in the read direction HR are arranged successively in the read direction HR.

In this embodiment, in each servo data area set, the two second servo data areas 20 precede the first servo data area 10 with respect to the read direction HR. The number of the second servo data areas 20 in each servo data area set is not limited to two.

Figure 2B:
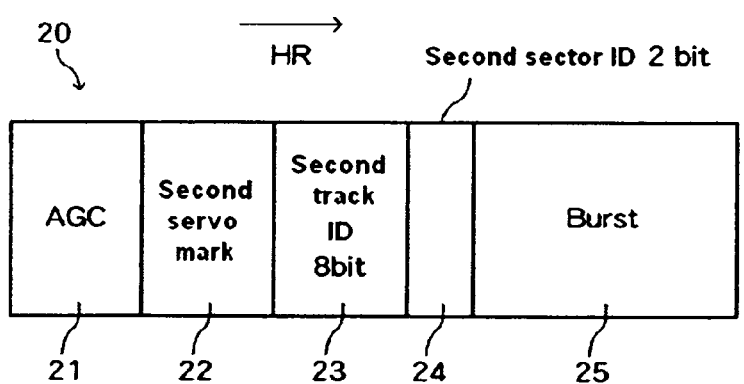

FIG. 2(A) shows the structure of the first servo data area 10 by way of example, and FIG. 2(B) shows the structure of the second servo data area 20 by way of example.

As shown in FIG. 2(A), the first servo data area 10 has a gain control data section (AGC) 11, a first servo mark section 12, a first track data section 13, a first sector data section 14, and a burst section 15 arranged in that order in the read direction HR.

The gain control data section 11 stores a signal for making the magnetic disk drive adjust the amplification factor of a head amplifier. The burst section 15 stores a signal for making the magnetic disk drive grasp the position of the magnetic head relative to the track.

The first servo mark section 12 stores first mark data indicating the first servo data area 10.

The first track data section 13 stores first track data indicating the track on which the first servo data area 10 is included among all the radially arranged tracks. The first track data indicates a track number peculiar to the track. The first track data can specify a position on the magnetic disk 1 with respect to a radial direction.

The first sector data section 14 stores first sector data indicating the positions of the first servo data areas 10 in the track. The first sector data indicates sector numbers assigned to sectors in ascending order in the read direction HR. The first sector data directly specifies the circumferential positions of the magnetic disk 1.

As shown in FIG. 2(B), the second servo data area 20 has a gain control data section (AGC) 21, a second servo mark section 22, a second track data section 23, a second sector data section 24, and a burst section 25 arranged in that order in the read direction HR.

The gain control data section 21, similarly to the gain control data section 11, stores a signal for making the magnetic disk drive adjust the amplification factor of the head amplifier. The burst section 25, similarly to the burst section 15, stores a signal for making the magnetic disk drive grip the position of the magnetic head relative to the track.

The second servo mark section 22 stores second mark data indicating the second servo data areas 20. The bit length of the second servo mark section 22 is equal to that of the first servo mark section 12.

The second track data section 23 stores second track data indicating the track on which the second servo data areas 20 are included among the adjacent tracks. The second track data identifies the relevant track among the adjacent tracks by a track number of a bit length shorter than that of the track number represented by the first track data.

In this embodiment, the second track data represents the lower bits of predetermined digit positions in the track number represented by the first track data. Thus the relevant track among the number represented by the lower bits of the adjacent tracks can be identified. For example, if the lower bits are eight digit positions, the relevant track among 256 (28) tracks equally distributed on the opposite sides around the first track data the relevant track can be identified. Hereinafter, a range covering those adjacent tracks will be referred to as "adjacent track range".

When the magnetic disk drive operates for positioning the magnetic head or a seek operation for moving the magnetic head such that magnetic head is moved for a moving distance within the adjacent track range, the second track data can indicate a position with respect to a radial direction on the magnetic disk 1.

The second sector data section 24 stores second sector data indicating the positions of the second servo data areas 20 with respect to the positions of the first servo data sections 10. The second sector data indicates distances of the positions of the second servo data areas 20 in the read direction HR from the first servo data area 10 by numbers of a bit length shorter than that of the sector number indicated by the first sector data. More concretely, the second servo data represents numbers indicating order of the second servo data areas 20 arranged in the read direction HR with respect to the first servo data area 10.

Since the distances of the positions of the second servo data areas 20 in the read direction HR from the position of the first servo data area 10 can be determined from the second sector data, the circumferential positions of the second servo data areas 20 on the magnetic disk 1 can be indirectly determined by determining the circumferential position of the first servo data area 10 on the magnetic disk 1 from the first sector data stored in the first servo data area 10.

Figure 3:
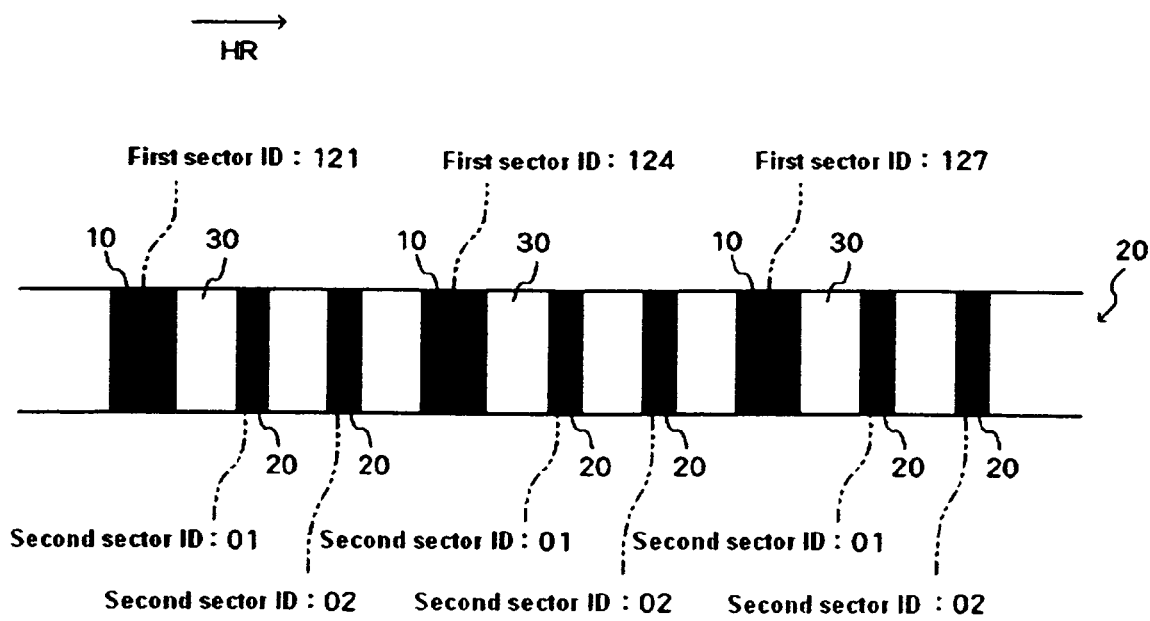
FIG. 3 is a diagrammatic view showing the contents of the first and the second servo data areas in the magnetic disk by way of example.

FIG. 3 is a view of assistance in explaining, by way of example, the contents of the first sector data stored in the first servo data areas 10 and the second sector data stored in the second servo data areas 20.

The first sector data stored in the first servo data areas 10 represents serial sector numbers of sectors arranged in the read direction HR. The sector numbers represented by the first sector data represent the number of the servo data areas arranged in the read direction HR in the track 2. For example, the interval between adjacent one of numbers 121, 124, 127 and such is equal to the number of the second servo data areas 20 between the successive first servo data areas 10. In this embodiment, the two first servo data areas 20 are arranged between the two successive first servo data areas 10. A circumferential position on the magnetic disk 1 can be specified by the sector number represented by the first sector data.

The second sector data stored in the second servo data areas 20 represents serial numbers, such as 1 and 2, of the second servo areas 20 arranged in that order in the read direction HR with respect to the first servo data area 10. Therefore, the circumferential position of the second servo data area 20 on the magnetic disk 1 can be specified by a number, such as a sector number 126, obtained by adding a sector number, such as sector number 2, represented by the second sector data to a sector number, such as sector number 124, represented by the first sector data stored in the first servo data area 10 immediately before the second servo data area 20.

Thus, in the magnetic disk 1, the second servo data area 20 includes the second track data section 23 and the second sector data section 24 storing amounts of data smaller than those of data stored in the first track data section 13 and the first sector data section 14 of the first servo data area 10. Consequently, increase in the ratio of the servo data to all the data stored in the magnetic disk 1 can be prevented.

Figure 4:
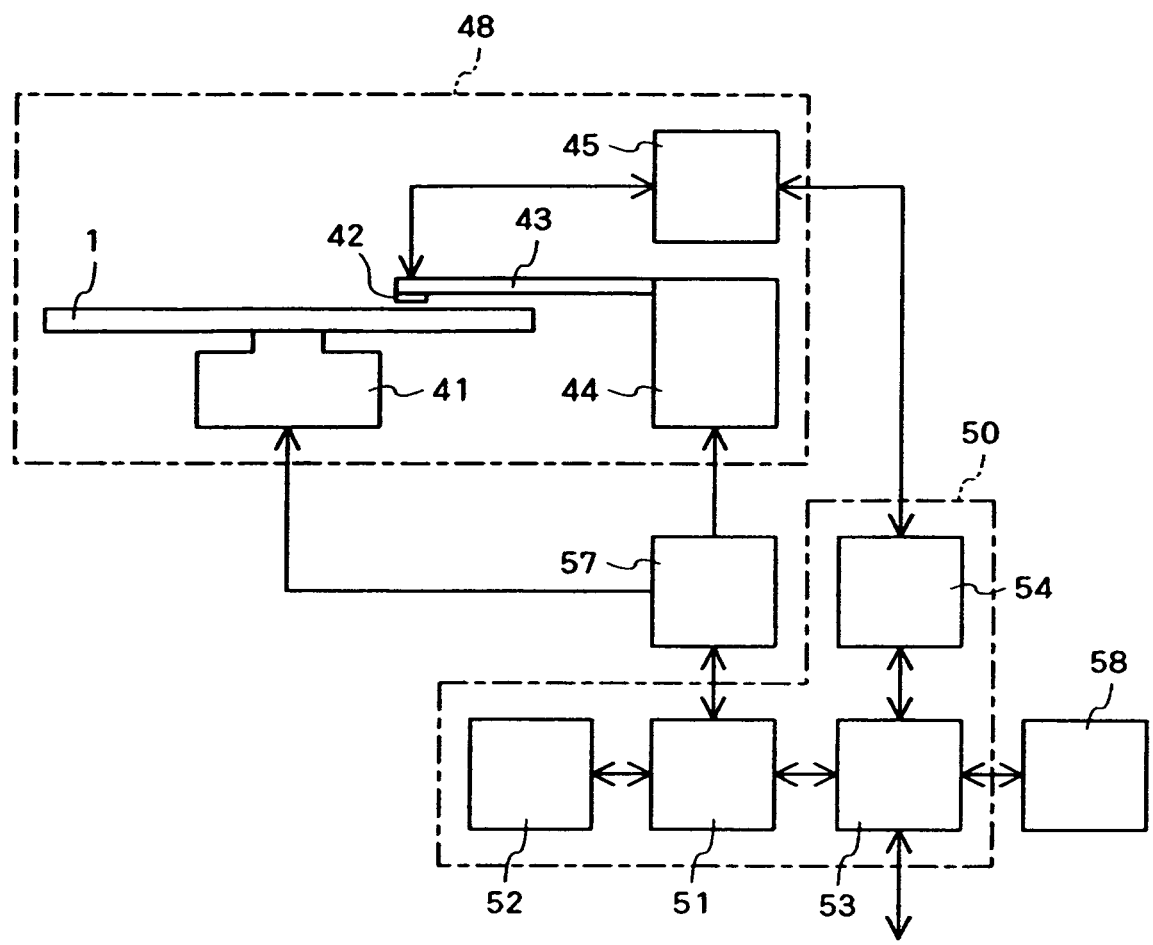
FIG. 4 is a block diagram of a magnetic disk drive.

FIG. 4 is a block diagram of a magnetic disk drive. In the magnetic disk drive, the foregoing magnetic disk 1, a spindle motor 41, a magnetic head 42, a suspension arm 43, a voice coil motor 44, namely, an actuator, and a head amplifier 45 are held in a case 48.

The magnetic disk drive includes a main circuit 50, namely, a position control circuit, a buffer memory 58, and a motor drive 57 disposed outside the case 48. The main circuit 50 includes a microprocessor unit (MPU) 51, a memory 52, a hard disk controller (HDC) 53, and a read/write channel (R/W channel) 54.

The magnetic disk 1 is mounted on and driven for rotation by the spindle motor 41. The magnetic head 42 writes data magnetically to and reads data magnetically from the magnetic disk 1. The magnetic head 42 is held on the tip of the suspension arm 43. The suspension arm 43 is turned on a pivot by the voice coil motor 44 to move the magnetic head 42 held on the tip of the suspension arm 43 above the magnetic disk 1 substantially along a radius of the magnetic disk 1.

The MPU 51 controls all the operations of the magnetic disk drive. Upon the reception of a write or read command sent out from a host device from the HDC 53, the MPU 51 controls the voice coil motor 44 according to the command to move the magnetic head 42 to a position corresponding to a desired track on the magnetic disk 1 for writing or reading operations.

The MPU 51 determines the present position of the magnetic head 42 on the basis of servo data received from the HDC 53 and obtains a position error signal (PES) representing the difference between a desired position of the magnetic head 42 described in the write or read command and the present position of the same. Then, the MPU 51 generates a drive signal for driving the voice coil motor 44 from the position error signal, and gives the drive signal to the motor driver 58.

The MPU 51 executes a seek control operation for moving the magnetic head 42 to a position corresponding to the desired track and a positioning operation for positioning the magnetic head 42 at the position corresponding to the desired track to move the magnetic head 42 to the position corresponding to the desired track. Those operations will be described later.

The memory 52 includes a flash memory and a RAM (random-access memory). The flash memory stores programs to be carried out by the MPU 51. The RAM serves as a work memory for the MPU 51.

Upon the reception of the drive signal for driving the voice coil motor 44 from the MPU 51, the motor driver 58 converts the drive signal into an analog drive signal, amplifies the analog drive signal and gives the amplified analog drive signal to the voice coil motor 44. Upon the reception of a drive signal for driving the spindle motor 41 from the MPU 51, the motor driver 58 converts the drive signal into an analog drive signal, amplifies the analog drive signal and gives the amplified analog drive signal to the spindle motor 41.

The HDC 53 includes an interface controller, an error correcting circuit, a buffer controller and a servo controller.

Upon the reception of data to be written to the magnetic disk 1, namely, write data, from the external host device, the HDC 53 sends out the write data to the R/W channel 54. Upon the reception of data read from the magnetic disk 1, namely, read data, from the R/W channel 54, the HDC 53 sends the read data to the external host device. The HDC 53 is controlled by the MPU 51 so as to hold the write data and the read data temporarily in the buffer memory 57.

Upon the reception of a write or read command from the host device, the HDC 53 sends the write or read command to the MPU 51. The HDC 53 sends servo data acquired from the R/W channel 54 to the MPU 51. The acquirement of the servo data will be described later.

Upon the reception of the write data from the HDC 53, the R/W channel 54 modulates the write data, converts the modulated write data into an analog signal and gives the analog signal to the head amplifier 45. When a signal read from the magnetic disk 1 is given to the R/W channel 54 by the head amplifier 45, the R/W channel 54 converts the signal into digital data, demodulates the digital data and gives the demodulated signal to the HDC 53.

The R/W channel 54 samples servo data from the read data at a predetermined sampling period and gives the servo data to the HDC 53. Sampling the servo data will be described later.

Upon the reception of a write signal to be written to the magnetic disk 1 from the R/W channel 54, the head amplifier 45 amplifies the write signal and gives the amplified write signal to the magnetic head 42. Upon the reception of a read signal read from the magnetic disk 1 from the magnetic head 42, the head amplifier 45 amplifies the read signal and gives the amplified read signal to the R/W channel 54.

Figure 5:
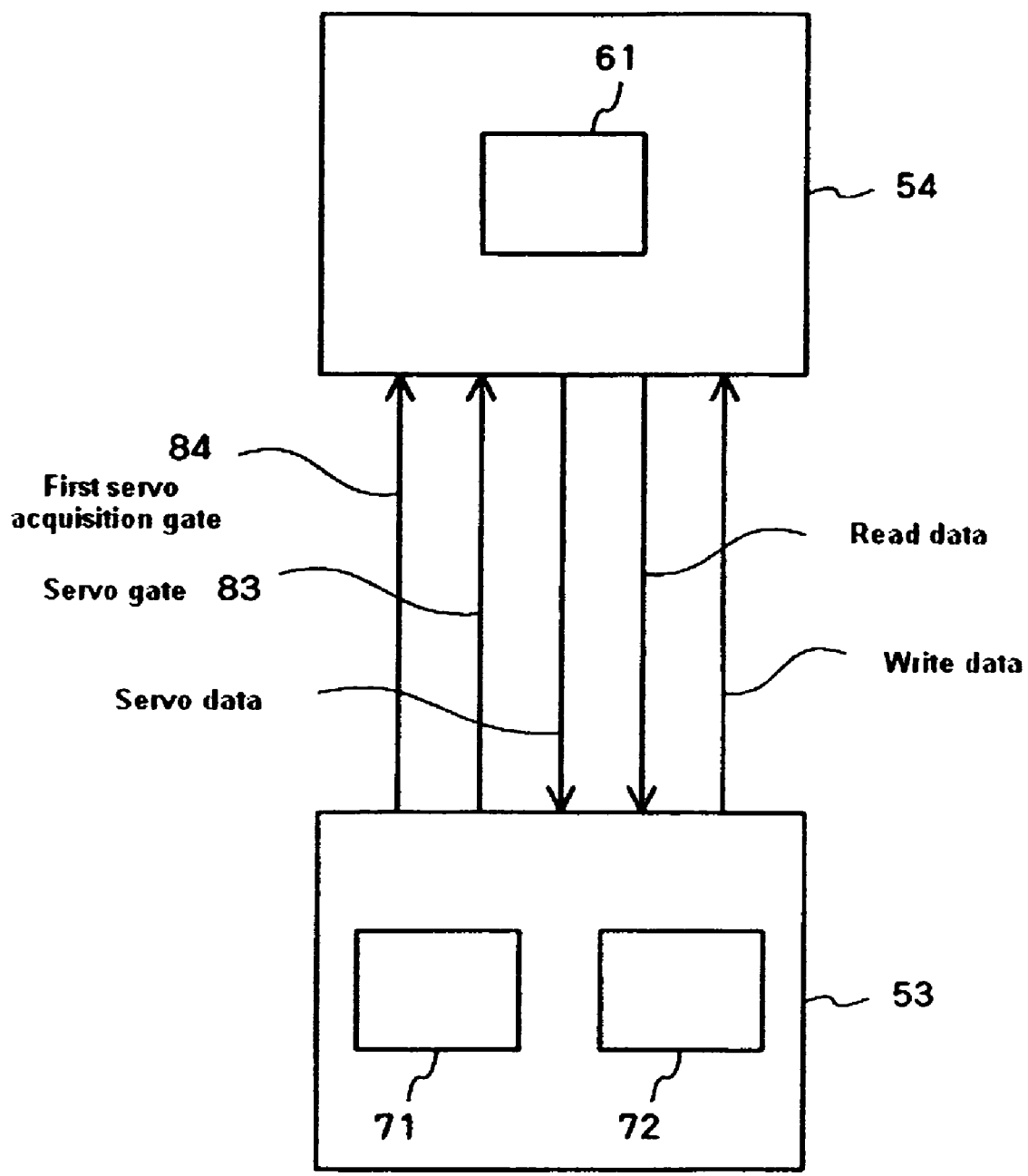
FIG. 5 is a block diagram of an essential part of the magnetic disk drive.

FIG. 5 is a view of assistance in explaining the HDC 53 and the R/W channel 54. The R/W channel 54 gives the user data included in the read data to the HDC 53. The HDC 3 gives the write data to the R/W channel 54.

The R/W channel 54 has a position information sampler 61 for sampling servo data from the read data. The position information sampler 61 samples servo data from the read data when the HDC 53 asserts a servo gate 83 in a predetermined timing, and gives the sampled servo data to the HDC 53. The operation of the HDC 53 for timing asserting the servo gate 83 determines the sampling period at which the servo data is sampled.

The position information sampler 61 is capable of discriminating first mark data included in first servo data, and second mark data included in the second servo data from each other. In a state where a first servo acquisition gate 84 is asserted by the HDC 53, the first servo data is sampled from the read data. In a state where the first servo acquisition gate 84 is negated by the HDC 53, the second servo data is sampled from the read data.

More concretely, when the HDC 53 asserts the servo gate 83 and the first servo acquisition gate 84 is asserted, the position information sampler 61 detects the first mark data, samples the first track data and the first sector data following the first mark data and sends the sampled data to the HDC 53. When the HDC 53 asserts the servo gate 83 and negates the first servo acquisition gate 84, the position information sampler 61 detects the second mark data, samples the second track data and the second sector data following the second mark data, and gives the sampled data to the HDC 53.

As shown in FIGS. 1 and 3, in the magnetic disk 1 in this embodiment, the plural sets each of the first servo data area 10 and the plural second servo data areas 20 arranged in that order in the read direction HR are arranged successively in the read direction HR. Therefore, the HDC 53 times asserting servo gate 83 and the first servo acquisition gate 84 to obtain the first servo data and the second servo data from the data read from the magnetic disk 1.

Thus the HDC asserts the servo gate 83 at times when the servo data appears in the read data, asserts the first servo acquisition gate 84 at times when the first servo data appears, and negates the first servo acquisition gate 84 at ties when the second servo data appears. For example, when a first servo data area 10 and M second servo data areas 20 are arranged in that order in the read direction HR on the magnetic disk 1 an assertion period at which the first servo acquisition gate 84 is asserted is M+1 times a sampling period at which the servo gate 83 is asserted.

The MPU 51 receives the thus acquired first sector data and the second sector data from the HDC 53, and determines the position of the magnetic head 42 relative to the magnetic disk 1 on the basis of the received data. A circumferential position on the magnetic disk 1 is directly specified by using a sector number represented by the first sector data, and a circumferential position on the magnetic disk 1 is indirectly specified by using a number obtained by adding a number represented by the second sector data following the first sector data to the sector number represented by the precedent first sector data.

In this magnetic disk drive, the first sector data is acquired first from the read data read from the magnetic disk 1, and then a position on a track corresponding to the magnetic head 42 is determined on the basis of the first servo data. Subsequently, the second servo data is acquired, the distance between the position specified by the first servo data on the track and a position corresponding to the magnetic head 42 is determined on the basis of the second servo data to determine the position of the magnetic head 42 relative to the magnetic disk 1. The magnetic disk drive also acquires the first sector data first, for example, in a case where the position of the magnetic head 42 relative to the magnetic disk 1 is specified for the first time after the magnetic disk drive 1 has been connected to a power supply.

To acquire only the first servo data from the read data read from the magnetic disk 1, the HDC 53 asserts the servo gate 83 at the time the first servo data appears in the read data and asserts the first servo acquisition gate 84 at the same time. For example, when a first servo data area 10 and M second servo data areas 20 are arranged in that order in the read direction HR on the magnetic disk, a sampling period at which the second servo gage 83 is asserted is M+1 times a sampling period at which both first and the second servo data are acquired. Only the first servo data can be acquired from the read data by asserting the first servo acquisition gate 84 at that period.

The HDC 53 has an index counter 71 for counting the number of the acquired servo data, and a sector counter 72 for counting the number of the acquired second servo data.

The index counter 71 is set to a sector number represented by the first sector data when the first servo data is acquired. The sector number is incremented by one every time the second servo data is acquired. Thus the position on the track corresponding to the magnetic head 42 can be also specified by the index counter 71. A number counted by the index counter 71 is used for deciding whether or not the servo data has been properly acquired, which will be described later.

The sector counter 72 is set to an initial value 0 when the first servo data is acquired. The number counted by the sector counter 72 is incremented by one every time the second servo data is acquired. Thus the distance between the current position of the magnetic head 42 and a position corresponding to a position on the track specified by the first servo data can be specified by the number counted by the sector counter 72. The number counted by the sector counter 72 is used for examining whether or not the servo data is properly acquired, which will be described later.

A description will be made of a seek control procedure and a magnetic head positioning control procedure to be executed by the MPU 51 to move the magnetic head 42 to a position corresponding to a desired track of the magnetic disk 1.

Figure 6:
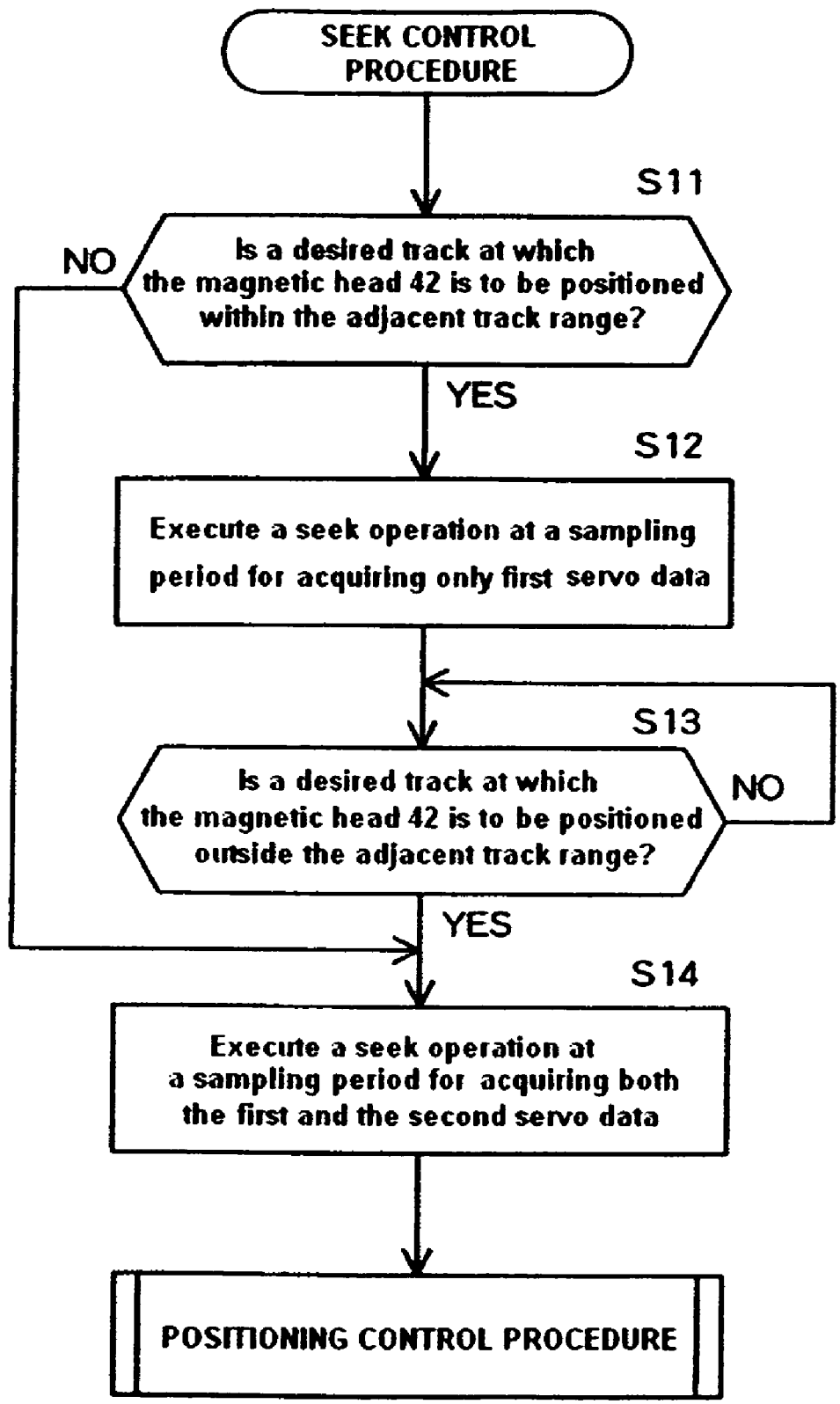
FIG. 6 is a low chart of a seek control procedure to be executed by the magnetic disk drive.

FIG. 6 is a flow chart of the seek control procedure for moving the magnetic head 42 to a position corresponding to a desired track. First the MPU 51 decides in step S11 whether or not a desired track at which the magnetic head 42 is to be positioned described in a write or read command received from the external host device is within an adjacent track range equally extended on the opposite sides of a track corresponding to around the present position of the magnetic head 42.

The relevant track in the adjacent track range can be identified by the second track data represented by the lower bits of predetermined digit positions in the first track data. For example, when the second track data is represented by lower bits of N digit positions, the adjacent track range covers 2N−1 tracks on each of the inner and the outer side of the track corresponding to the present position of the magnetic head.

If the response to the query made in step S11 is affirmative, namely, the track corresponding to the desired position of the magnetic head 42 is not within the adjacent track range, the MPU 51 controls the HDC 53 so as to acquire only the first servo data from the read data, determines the present position of the magnetic head 42 on the basis of the first servo data, and moves the magnetic head 42 for a seek operation on the basis of the present position in step S12. As mentioned above, only the first servo data can be acquired by changing the sampling period at which the HDC 53 samples the servo data.

After the seek operation has been started, the MPU 51 performs predetermined operations including a speed reducing operation which is started upon the arrival of the magnetic head 42 at about the middle point of a seek length. When the track corresponding to the desired position of the magnetic head 42 is within the adjacent track range, i.e., if the response to the query made in step S13 is affirmative, the MPU 51 controls the HDC 53 so as to acquire both the first and the second servo data from the read data, determines the present position of the magnetic head 42 on the basis of those servo data, and controls the magnetic head 42 for a seek operation on the basis of the present position (Step S14).

Upon the arrival of the magnetic head 42 at a desired position corresponding to the desired track, the MPU 51 executes a magnetic head positioning control operation to position the magnetic head at the desired position corresponding to the desired track.

The magnetic disk drive can move the magnetic head 42 for the seek operation over the entire radial range on the magnetic disk 1 storing the first and the second track data.

Although this embodiment decides whether or not the desired track corresponding to the desired position of the magnetic head 42 is within the adjacent track range, a decision may be made as to whether or not a moving rate at which the magnetic head 42 is moved for the seek operation exceeds the adjacent track range equally extended on the opposite sides of a track corresponding to around the present position of the magnetic head 42.

Figure 7:
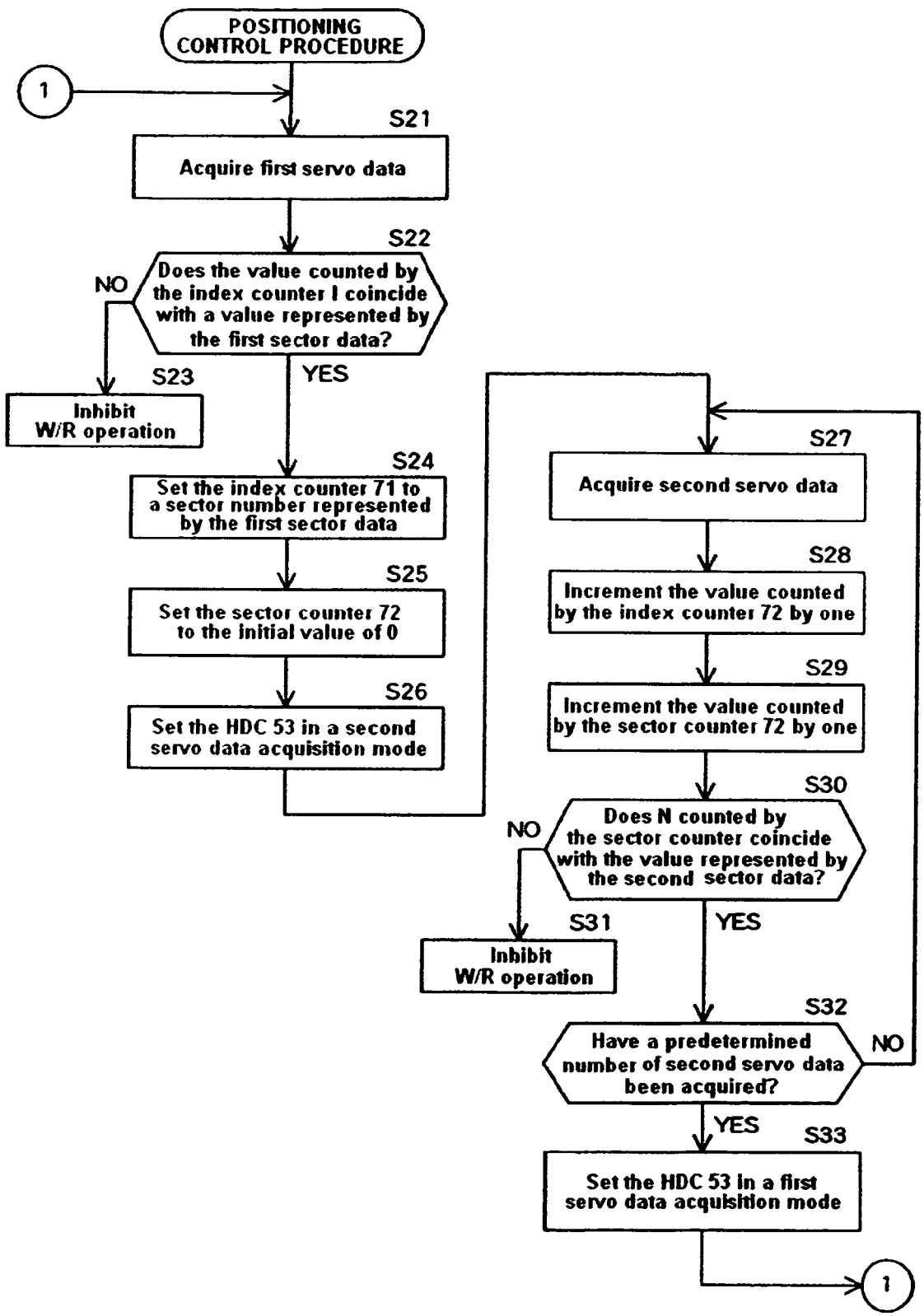
FIG. 7 is a flow chart of a magnetic head positioning control procedure to be executed by the magnetic disk drive.

FIG. 7 is a flow chart of the magnetic head positioning control procedure for positioning the magnetic head 42 at a position corresponding to the desired track. Upon the arrival of the magnetic head 42 at the position corresponding to the desired track, the MPU 51 starts the magnetic head positioning control procedure to write or read user data.

The MPU 51 acquires the first servo data from the HDC 53 in step S21. Then, the MPU 51 compares a sector number represented by the first sector data included in the first servo data and a number counted by the index counter 71 in step S22. If those numbers are equal to each other, i.e., if the response to a query made in step S22 is affirmative, the MPU 51 sets the index counter 71 to a sector number represented by the first sector data included in the first servo data in step S24 and sets the sector counter 72 to the initial value of 0 in step S25. Then, the MPU 51 sets the HDC 53 in a second servo data acquisition mode in step S26. Those steps are achieved by making the HDC 53 negate the first servo acquisition gate 84 as mentioned above in connection with FIG. 5.

If the sector number represented by the first sector data does not coincide with the number counted by the index counter 71, i.e., if the response to the query made in step S22 is negative, the operation for writing or reading the user data is stopped in step S23.

The index counter 71 is set to a sector number represented by the first sector data acquired in the preceding sampling cycle and the number is incremented by one every time the second servo data is acquired. Therefore, the number counted by the index counter 71 should coincide with a sector number represented by the first sector data acquired in the succeeding sampling cycle when those servo data are acquired properly. Thus, when the number counted by the index counter 71 does not coincide with the sector number represented by the first sector data, it is decided that the servo data are not properly acquired and the write or the read operation is stopped.

Upon the reception of the second servo data from the HDC 53 in step S27, the MPU 51 increments the numbers counted respectively by the index counter 71 and the sector counter 72 by one in step S28 and step S29. In step S30, the MPU 51 makes a query to see whether or not a number represented by the second sector data included in the second servo data is equal to the number counted by the second counter 72. If the response to the query made in step S30 is affirmative, operations for acquiring those second servo data and the associated operations until a predetermined number of second servo data are acquired while the response to a query made in step S32 is negative.

The predetermined number corresponds to the number of second servo data that appears in a period between the appearance of the preceding first servo data and that of the succeeding first servo data, and is dependent on the number of the second servo data areas 20 between the adjacent first servo areas 10 (FIGS. 1 and 3).

After the MPU 51 has acquired the predetermined number of second servo data, i.e., if the response to a query made in step S32 is affirmative, the HDC 53 is set in a first servo data acquisition mode in step S33, and the procedure returns to step S21 to repeat the first servo data acquiring steps. This is achieved by making the HDC 53 assert the first-servo acquisition gate 84 (FIG. 5).

On the other hand, if the response to the query made in step S30 is negative, i.e., if the number represented by the second sector data included in the second servo data and the value counted by the sector counter 72 do not coincide with each other, operations for writing or reading user data is stopped in step S31.

The number counted by the sector counter 72 is cleared upon the acquisition of the first servo data and is incremented by one every time the second servo data is acquired. Therefore, a number represented by the acquired second sector data should coincide with the number counted by the sector counter 72 if those servo data are acquired properly. If the number and the value counted by the sector counter 72 do not coincide with each other, operations for writing or reading user data is stopped.

The magnetic disk drive can grasp the position of the magnetic head 42 even if the magnetic disk 1 stores the first sector data and the second sector data through the foregoing operation.

What is claimed is:

1. A recording disk having first and second servo areas arranged along tracks,
   wherein each of the first servo data areas includes a first sector data part indicating the position of the first servo data area in the track, and
   each of the second servo data areas includes a second sector data part indicating a distance in a read direction from the position of the second servo data area to the position of the first servo data area and a burst section indicating a position in the track and storing a less amount of data than the first sector data part.

2. The recording disk according to claim 1, wherein the first servo data area includes a first track data part identifying the track among all the tracks, and
   the second servo data area includes a second track data part identifying the track among the adjacent tracks and storing a less amount of data than the first track data part.

3. A disk drive comprising:
   a recording disk having first and second servo areas arranged along tracks, wherein each of the first servo data areas includes a first sector data part indicating the position of the first servo data area in the track, and
   each of the second servo data areas includes a second sector data part indicating a distance in a read direction from the position of the second servo data area to the position of the first servo data area and a burst section indicating a position in the track and storing a less amount of data than the first sector data part;
   a head for reading servo data from the recording disk;
   an actuator for moving the head relative to the recording disk; and
   a position control circuit for indicating the present position of the head on the basis of servo data read by the read head, and driving the actuator on the basis of a positional error between a desired position of the read head and the present position of the read head;
   wherein the position control circuit indicates a position of the head on the track on the basis of the servo data read from the first servo data area, and then indicates the position of the head on the track by indicating the position of the head with respect to the indicated position on the basis of the servo data read from the second servo data area.

4. The disk drive according to claim 3, wherein the position control circuit includes a sector counter for counting the number of cycles of an operation performed for reading servo data from the second servo data area after the servo data has been read from the first servo data area.

5. The disk drive according to claim 4, wherein data representing order of the second servo data areas arranged in a direction in which the data reading operation of the head proceeds with respect to the first servo data area is recorded in the second sector data part included in the second servo data area, and the position control circuit compares the order of the second servo data read from the second servo data area and the number of cycles of an operation for reading data from the second servo data areas counted by the counter to see whether or not the order of the second servo data and the number of cycles of the operation coincide with each other.

6. The disk drive according to claim 4, wherein the position control circuit indicates the present position of the head by acquiring only the servo data from the first servo data area when a position to which the head is to be moved with respect to the present position of the read head is outside an adjacent track range covering the adjacent tracks, and the position control circuit indicates the present position of the head by acquiring the servo data from the first and the second servo data area when a position to which the read head is to be moved is within the adjacent track range.

7. The disk drive according to claim 5, wherein the position control circuit indicates the present position of the head by acquiring only the servo data from the first servo data area when a position to which the head is to be moved with respect to the present position of the read head is outside an adjacent track range covering the adjacent tracks, and the position control circuit indicates the present position of the head by acquiring the servo data from the first and the second servo data area when a position to which the read head is to be moved is within the adjacent track range.

8. The disk drive according to claim 3, wherein the position control circuit indicates the present position of the head by acquiring only the servo data from the first servo data area when a position to which the head is to be moved with respect to the present position of the read head is outside an adjacent track range covering the adjacent tracks, and the position control circuit indicates the present position of the head by acquiring the servo data from the first and the second servo data area when a position to which the read head is to be moved is within the adjacent track range.

9. A disk drive comprising:

a recording disk having first and second servo areas arranged along tracks, wherein each of the first servo data areas includes a first sector data part indicating the position of the first servo data area in the track, and each of the second servo data areas includes a second sector data part indicating a distance in a read direction from the position of the second servo data area to the position of the first servo data area and a burst pattern indicating a position in the track and storing a less amount of data than the first sector data part;

wherein the first servo data area includes a first track data part identifying the track among all the tracks, and the second servo data area includes a second track data part identifying the track among the adjacent tracks and storing a less amount of data than the first track data part;

a head for reading servo data from the recording disk;

an actuator for moving the head relative to the recording disk; and a position control circuit for indicating the present position of the head on the basis of servo data read by the read head, and driving the actuator on the basis of a positional error between a desired position of the read head and the present position of the read head;

wherein the position control circuit indicates a position of the head on the track on the basis of the servo data read from the first servo data area, and then indicates the position of the head on the track by indicating the position of the head with respect to the indicated position on the basis of the servo data read from the second servo data area.

10. The disk drive according to claim 9, wherein the position control circuit includes a sector counter for counting the number of cycles of an operation performed for reading servo data from the second servo data area after the servo data has been read from the first servo data area.

11. The disk drive according to claim 10, wherein data representing order of the second servo data areas arranged in a direction in which the data reading operation of the head proceeds with respect to the first servo data area is recorded in the second sector data part included in the second servo data area, and the position control circuit compares the order of the second servo data read from the second servo data area and the number of cycles of an operation for reading data from the second servo data areas counted by the counter to see whether or not the order of the second servo data and the number of cycles of the operation coincide with each other.

12. The disk drive according to claim 10, wherein the position control circuit indicates the present position of the head by acquiring only the servo data from the first servo data area when a position to which the head is to be moved with respect to the present position of the read head is outside an adjacent track range covering the adjacent tracks, and the position control circuit indicates the present position of the head by acquiring the servo data from the first and the second servo data area when a position to which the read head is to be moved is within the adjacent track range.

13. The disk drive according to claim 11, wherein the position control circuit indicates the present position of the head by acquiring only the servo data from the first servo data area when a position to which the head is to be moved with respect to the present position of the read head is outside an adjacent track range covering the adjacent tracks, and the position control circuit indicates the present position of the head by acquiring the servo data from the first and the second servo data area when a position to which the read head is to be moved is within the adjacent track range.

14. The disk drive according to claim 9, wherein the position control circuit indicates the present position of the head by acquiring only the servo data from the first servo data area when a position to which the head is to be moved with respect to the present position of the read head is outside an adjacent track range covering the adjacent tracks, and the position control circuit indicates the present position of the head by acquiring the servo data from the first and the second servo data area when a position to which the read head is to be moved is within the adjacent track range.

* * * * *